United States Patent [19]

Ono et al.

[11] Patent Number: 5,179,142

[45] Date of Patent: Jan. 12, 1993

[54] POLYLACTONE-MODIFIED ORGANOPOLYSILOXANE COMPOUNDS

[75] Inventors: Ichiro Ono, Gunma; Hiroshi Yoshioka, Tokyo, both of Japan

[73] Assignee: Shin-Etsu Chemical Company, Limited, Tokyo, Japan

[21] Appl. No.: 532,719

[22] Filed: Jun. 4, 1990

[30] Foreign Application Priority Data

Jun. 2, 1989 [JP] Japan .................. 1-140632

[51] Int. Cl.$^5$ ............ C08L 1/00; C08L 83/10; C08L 83/12; C08G 77/01
[52] U.S. Cl. ................... 524/35; 524/425; 524/436; 524/437; 524/442; 524/445; 524/449; 524/451; 524/779; 524/786; 524/788; 524/789; 524/791; 525/100; 525/104; 525/105; 525/106; 525/393; 525/446; 525/453; 525/464; 525/476; 525/477; 528/15; 528/18; 528/25; 528/28
[58] Field of Search ............ 528/15, 18, 26, 28, 528/25; 525/100, 104, 105, 106, 453, 477, 392, 446, 476, 464, 411, 412, 413, 415; 524/35, 437, 451, 445, 425, 436, 449, 442, 786, 791, 789, 788, 779

[56] References Cited

U.S. PATENT DOCUMENTS

| | | | |
|---|---|---|---|
| 3,919,438 | 11/1975 | Urkevich | 427/54 |
| 4,613,641 | 9/1986 | Hausennestel et al. | 524/267 |
| 4,636,552 | 1/1987 | Gay et al. | 525/63 |
| 4,812,518 | 3/1989 | Haubennestel et al. | 525/100 |

FOREIGN PATENT DOCUMENTS

WO86/04072 7/1986 World Int. Prop. O. .

Primary Examiner—Ralph H. Dean, Jr.
Attorney, Agent, or Firm—Millen, White, Zelano and Branigan

[57] ABSTRACT

A polylactone-modified organopolysiloxane compound, wherein a polylactone-containing group represented by the formula (I) is bound to a silicon atom located at at least either of the terminal positions and/or intermediate positions to impart excellent properties as a synthetic resin modifier (when Y in (I) is an acetyl group or a hydrogen atom) or as a film former (when Y in (I) is a hydrogen atom):

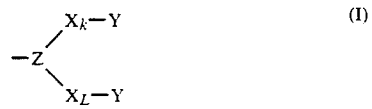

wherein Z represents a trivalent hydrocarbon residue which may contain oxygen, sulfur or/and nitrogen atom(s); X represents a lactone group of the formula,

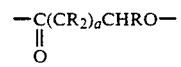

(wherein R represents a hydrogen atom or an alkyl group containing from 1 to 12 carbon atoms; a represents an integer from 4 to 6), k and L each represents an integer of 1 or more; and Y represents a hydrogen atom or an acetyl group.

16 Claims, 4 Drawing Sheets

POLYLACTONE-MODIFIED ORGANOPOLYSILOXANE COMPOUNDS

FIELD OF THE INVENTION

This invention relates to novel organopolysiloxane compounds and, more particularly, to lactone-modified organopolysiloxane compounds useful as a film former or a synthetic resin modifier.

BACKGROUND OF THE INVENTION

Organopolysiloxane compounds are well appreciated and often used in various fields because of their excellence in thermal stability, water repelling power, and interfacial characteristics including abilities to defoam, to release molds, and so on. In recent years in particular, not only the range of their use as film former, in which their specific interfacial characteristics are fully utilized, has been increasing, but also practical applications of organopolysiloxane compounds as modifier for imparting their thermal and interfacial characteristics to various resins have been positively developed.

More specifically, dimethylpolysiloxane, methylphenyl-polysiloxane, reactive group-containing dimethylpolysiloxanes, polyether-modified organopolysiloxanes and the like have been used for improving on properties of synthetic resins to constitute coating materials, moldings and so on.

However, those organopolysiloxanes are under some restrictions as to the usable range because of their insufficient compatibilities with resins or their inadequate heat resistance. Thereupon, polylactone-modified organopolysiloxane compounds have been designed so as to diminish these defects, and achieved considerable effect (, as disclosed in Japanese Patent Publication KOKAI (unexamined published Japanese Patent Application) Nos. 59-207922, 61-37843 and 62-187772).

However, all of those compounds are still insufficient in compatibilities with resins to be modified, because the polylactone groups attached to silicon atoms have a straight-chain form. Therefore, the development of organopolysiloxanes which undergo further improvement in compatibility with resins has been desired.

SUMMARY OF THE INVENTION

As results of concentrating our energies on realization of the above-described request, it has now been found that polylactone-containing groups highly compatible with various synthetic resins can be introduced into organopolysiloxane compounds as the groups are allowed to assume a branched structure, and the thus polylactone-modified organopolysiloxane compounds are superior to the above-described, conventional polylactone-modified organopolysilxane compounds in imparting the characteristics of the parent organopolysiloxanes to various synthetic resins, because the polylactone-containing groups having a branched structure have not only extremely high compatibilities with various resins but also a function like an anchor and, what is more, a more flexible polysiloxane structure, thus achieving the present invention.

Accordingly, a first object of this invention is to provide a novel modified organopolysiloxane compound which has high compatibilities with various resins, and can impart the characteristics of organopolysiloxanes to those resins.

A second object of this invention is to provide a modified organopolysiloxane compound which has excellent function as the main component of a synthetic resin modifier.

A third object of this invention is to provide a modified organopolysiloxane compound which has excellent function as the main component of a film former.

The above-described objects are attained with a polylactone-modified organopolysiloxane compound, which contains at least one terminal position and/or intermediate position silicon atom(s) to which a polylactone-containing group represented by the formula (I) is bound:

wherein Z represents a trivalent hydrocarbon residue which may contain oxygen, sulfur or/and nitrogen atom(s); X represents a lactone group of the formula, wherein R represents a hydrogen atom or an alkyl group containing from 1 to 12 carbon atoms; a represents an integer from 4 to 6; k and L each represents an integer of 1 or more; and Y represents a hydrogen atom or an acetyl group.

DETAILED DESCRIPTION OF THE INVENTION

Specific examples of Z in the foregoing general formula (I) include and so on, and the polylactone moieties represented by is obtained by the ring-opening polymerization of a lactone compound represented by with specific examples including δ-valerolactone, ethyl-δ-valerolactone, ε-caprolactone, methyl-ε-caprolactone, ethyl-ε-caprolactone, butyl-ε-caprolactone, dimethyl-ε-caprolactone, trimethyl-ε-caprolactone, enantholactone and so on.

Typical representatives of the polylactone-modified organopolysiloxane compounds are represented by the following general formula:

wherein A represents a polycaprolactone-containing group of the formula,

B and D each represents A or methyl group; m represents an integer from 0 to 200; and n represents an integer from 0 to 20; but wherein when n is 0, at least either B or D must be A.

Such organopolysiloxane compounds can be synthesized using various methods. For instance, a synthesis method as described below can be employed.

The addition reaction product of the first organopolysiloxane containing —SiH group (∼SiH) and glycerine monoallyl ether is described, e.g., in Japanese Patent Publication KOKAI No. 57-149290. This addition product, though is not particularly limited in preparation method, can be prepared by carrying out the addition reaction using as a catalyst a transition metal compound, such as a platinum compound, a rhodium compound, etc., in the range of 50° C. to 150° C. in the absence of any solvent or in the presence of an inert solvent. Suitable examples of an inert solvent which can be used therein include aromatic hydrocarbons such as benzene, toluene, xylene, etc., aliphatic hydrocarbons such as n-hexane, n-heptane, etc., ethers such as dibutyl ether, etc., and so on.

The subsequent ring-opening polymerization of ε-caprolactone in the presence of the OH groups in the addition product may be carried out using a catalyst, e.g., an organometallic compound, in an atmosphere of nitrogen in the range of 100° C. to 200° C. In this reaction also, a solvent, such as an aromatic hydrocarbon including toluene, xylene and the like, an aliphatic hydrocarbons including n-octane, n-decane and the like, or a ketone including methyl isobutyl ketone, diisobutyl ketone, cyclohexanone and the like, can be used. Suitable examples of an organometallic compound include dibutyltin dioctate, dibutyltin dilaurate, tetrapropyl titanate, tetrabutyl titanate, and the like.

The thus prepared polycaprolactone-modified organopolysiloxane compounds are reactive compounds having terminal hydroxyl groups, and useful as film former. When it is desired to use them as synthetic-resin modifier, on the other hand, these hydroxyl groups may be acetylated to block the active hydrogens. This acetylation reaction can be effected by allowing the hydroxyl groups to react with acetic anhydride at 10°–80° C. using a catalyst such as sulfuric acid, p-toluenesulfonic acid, zinc chloride, sodium acetate, pyridine, triethylamine or so on. Therein, an inert solvent as cited above can also be used.

The above illustrated method involves carrying out the ring-opening polymerization of ε-caprolactone using glycerine monoallylether as an initiator, and mak- ing the obtained allyl group-containing polycaprolactone undergo the addition reaction with SiH group-containing organopolysiloxane (∼SiH) to produce polycaprolactone-modified organopolysiloxane. Catalysts, solvents, temperatures and other conditions for the ring-opening polymerization and the addition reaction may be the same as in the synthesis method 1.

Specific examples of the organopolysiloxane compounds of this invention are illustrated below. Therein, E in every structural formula represents

$$-\!\!\left(\!\!\begin{array}{c}C(CH_2)_5O\\\|\\O\end{array}\!\!\right)\!\!-.$$

-continued

-continued

The organopolysiloxane compounds of this invention which are modified by polylactones are characterized by the possession of both properties of an organopolysiloxane compound and those of a polylactone. More specifically, they are possessed of not only properties attributable to low surface energy of a polysiloxane, including a mold releasing ability, a water repelling power and slippability, and characteristics of siloxane bonds, including excellent heat resistance, gas permeability and so on, but also properties attributable to a polylactone, including good compatibilities with various organic resins, high shock resistance when added to organic resins, luster, surface-smoothness increasing effect and so on, without counteracting each other's characteristics.

Since the organopolysiloxane compounds of this invention have the above-described characteristics, they can be used for various purposes, especially can exhibit excellent abilities in using as a film former and a synthetic-resin modifier.

When the organopolysiloxane compounds of this invention are used as a film former, it is necessary for them to have terminal hydroxyl groups, and these hydroxyl groups are easily cross-linked with such a polyfunctional cross-linking agent as to have two or more of substituent groups reactive to hydroxyl group, such as isocyanate compounds having not less than two functional groups, to form a silicone-polyester-urethane film.

Any isocyanate compounds can be used as cross-linking agent as far as they have not less than two functional groups. Specific examples of usable isocyanate compounds include diisocyanates such as tolylenediisocyanate (TDI), diphenylmethanediisocyanate (MDI), tolidinediisocyanate (TODI), naphthalenediisocyanate (NDI), hexamethylenediisocyanate (HDI), isophoronediisocyanate (IPDI), xylylenediisocyanate (XDI), etc.; and polyisocyanates such as trimethylolpropane (TMP)-modified TDI, isocyanurate-bound TDI, TMP-modified HDI, isocyanurate-bound HDI, biuret-bound HDI, TMP-modified IPDI, isocyanurate-bound IPDI, etc. An appropriate compounding amount of an isocyanate compound as cited above ranges from 0.5 to 2.0 equivalents, particularly from 0.8 to 1.5 equivalents, to one equivalent of the terminal hydroxyl groups of the polylactone-modified organopolysiloxane compound of this invention.

Most of the polylactone-modified organopolysiloxane compounds of this invention are white solids with a melting point higher than room temperature because of polylactone's high propensity for crystallization, so it is desirable that they should be used in such a condition as to be dissolved in a proper solvent from the standpoint of the working facility in coating or other processings.

Solvents suitable for this purpose are those having such properties that the polylactone-modified organopolysiloxanes of this invention are soluble therein, and the resulting solutions can be readily dried by heating up to about 150° C., with specific examples including benzene, toluene, xylene, methylene chloride, chloroform, carbon tetrachloride, methyl ethyl ketone, cyclohexanone, ethyl acetate, butyl acetate, dioxane, dimethylformamide and so on.

The cross-linking reaction of the polylactone-modified organopolysiloxanes of this invention, though proceeds by heating even when any catalyst is not used, can be achieved in a low temperature condition by adding an organotin compound, such as dibutyltin dioctate, dibutyltin dilaurate or the like, as a catalyst in a proportion of 0.01 to 1.0 wt % to the effective components.

Also, an inorganic filler such as silica, alumina, glass powder, crystalline, clay, talc, calcium carbonate, mica powder, titanium dioxide, wollastonite, magnesium hydroxide or so on may be added for the purpose of heightening the strength of the hardened film. Further, other additives including an oxidation inhibitor, an aging inhibitor, an antistatic agent, a coloring agent and so on may be added.

Although the polylactone-modified organopolysiloxane compounds of this invention have the appearance of white solid as described above, they can converted to highly transparent films by being cross-linked with an isocyanate compound to result in the introduction of confusion into the crystallized polylactone moieties. Since the thus formed films are excellent in a mold releasing property, a heat resisting property, slippability, a water repelling power, and gas permeability, they are applicable as a coating agent for preventing heat-sensitive transfer paper or ink ribbon from suffering melt adhesion, a coating agent for water repellent finishing and protection of electric and electronic parts, a coating agent for building use, bicycle use, ship use, aircraft use or so on, a mold releasing agent, an antistain coating agent, a coating agent for protection against scrabble and patched paper, a coating agent for protection against water and snow adhesion, and so on.

Because of the presence of polylactone moieties excellent in compatibility with various synthetic resins in the polylactone-modified organopolysiloxanes of this invention, a flexible polysiloxane structure can be introduced to said synthetic resins. Therefore, when such synthetic resin compositions are applied to moldings, coating materials or so on, not only improved flexibility and shock resistance are imparted thereto, but also a low energy surface excellent in smoothness and luster can be formed due to the migration of the polysiloxane moiety to the resin surface, resulting in the appearance of such properties as to repel water, facilitate slipping, facilitate the mold-releasing, and so on.

The durability of these properties is highly satisfactory owing to the anchor-like function of the polylactone-containing groups excellent in compatibility with synthetic resins.

In particular, a further improvement in the durability is brought about in such a case that the terminal of the polylactone-containing moiety is hydroxyl group and the synthetic resin to be modified contains groups reactive to hydroxyl group, e.g., epoxy group, isocyanate group, carboxyl group, alkoxysilyl group and the like. This invention is not particularly limited with respect to synthetic resins to become a subject of modification. However, there can be given as typical examples polyethylene resin, polypropylene resin, polyvinyl chloride resin, polystyrene resin, acrylonitrilebutadiene-styrene (ABS) copolymer resin, acrylonitrilestyrene (AS) copolymer resin, styrene-butadiene (SB) copolymer resin, vinyl chloride-vinyl acetate copolymer resin, polymethylmethacrylate resin, saturated polyester resin, polyamide resin, polyurethane resin, epoxy resin, phenol resin, amino resin, polycarbonate resin, polyfluoroolefin resin, cellulose resin, polybutadiene resin, alkyd resin, melamine resin, silicone resin, modified silicone resins and so on.

The term silicone resin, though generally intended to include methylsilicones and methylphenylsilicones, is used in a wide sense in this invention to include up to silicate resins. On the other hand, the term modified silicone resins refers to the above-defined silicone resins modified with other organic resins.

Therefore, there can be cited as the modified silicone resins, for instance, acrylsilicone resin, polyestersilicone resin, epoxysilicone resin, urethanesilicone resin, phenolsilicone resin and alkidsilicone resin.

In the synthetic-resin modifier, a catalyst, a filler, a solvent and other additives, such as an antioxidant, an aging inhibitor, an antistatic agent, a coloring agent and so on, may be contained.

As described above in detail, the polylactone-modified organopolysiloxane compounds of this invention not only act effectively as modifier upon various kinds of synthetic resins, and thereby can impart the characteristics of the silicone resins to those synthetic resins as merits of each synthetic resin are exhibited, but also can function as film former by themselves. In addition, they can be synthesized with ease. That is, they are extremely useful.

EXAMPLES

This invention will now be illustrated in more detail by reference to the following examples. However, the invention should not be construed as being limited to these examples. Additionally, in the following examples, all hydroxyl equivalents are numerical values calculated from the hydroxyl values determined by the hydroxyl value measurement according to JIS K0070 described below, and Hydroxyl Value Measurement (JIS K0070)

An acetyl reagent comprising acetic anhydride and pyridine was added to a sample, and then heated to convert the hydroxyl groups in the sample to acetyl groups. Thereafter, water was added thereto to decompose the excess acetic anhydride into acetic acid, and then the resulting acetic acid was titrated by neutralization with 0.5N potassium hydroxide (ethyl alcohol solution).

$$\text{Hydroxyl value (mg KOH/g)} = \frac{(\alpha - \beta) \times f \times 28.05}{S} + \gamma$$

$\alpha$: An amount (ml) of 0.5N potassium hydroxide used in blank test.
$\beta$: An amount (ml) of 0.5N potassium hydroxide used in this test.
f: A factor of 0.5N potassium hydroxide.
S: An amount (g) of the sample used.
$\gamma$: An acid value.

Hydroxyl equivalent (g/mol) =

$$\frac{\text{molecular weight of KOH} \times 1,000}{\text{hydroxyl value}}$$

Synthesis Example 1

In a flask equipped with a cooling device, a thermometer and a stirring device, 354.5 g of SiH group-containing dimethylpolysiloxane compound having an average structural formula, 45.5 g of glycerine monoallyl ether, 0.2 g of 2 wt % 1-butanol solution of chloroplatinic acid and 400 g of toluene were placed, and underwent the addition reaction for 5 hours at 100° C. After the disappearance of SiH group was ascertained, toluene was removed under reduced pressure to obtain 398 g of hydroxyl group-containing dimethylpolysiloxane compound represented by the following structural formula. A hydroxyl equivalent of the thus obtained compound was 586 g/mol.

Synthesis Examples 2 to 6

Hydroxyl group-containing dimethylpolysiloxane compounds were obtained in the same manner as in Synthesis Example 1, except that the SiH-containing dimethylpolysiloxane compound used in Synthesis Example 1 were replaced by those set forth in Table 1, respectively.

TABLE 1

Synthesis Example 2:

Hydroxyl equivalent: 3,813 g/mol
SiH-containing dimethylpolysiloxane compound:                                         2,572.5 g Hydroxyl group-containing dimethylpolysiloxane compound:                              2615.2 g

Synthesis Example 3:

Hydroxyl equivalent: 810 g/mol
SiH-containing dimethylpolysiloxane compound:                                         509.9 g Hydroxyl group-containing dimethylpolysiloxane compound:                              549.8 g

Synthesis Example 4:

Hydroxyl equivalent: 1,063 g/mol
SiH-containing dimethylpolysiloxane compound:                                         685.9 g Hydroxyl group-containing dimethylpolysiloxane compound:                              729.5 g

Synthesis Example 5:

Hydroxyl equivalent: 100 g/mol
SiH-containing dimethylpolysiloxane compound:                                         23.1 g Hydroxyl group-containing dimethylpolysiloxane compound:                              68.1 g

Synthesis Example 6:

Hydroxyl equivalent: 268 g/mol

TABLE 1-continued

SiH-containing dimethylpolysiloxane compound:

136.8 g

Hydroxyl group-containing dimethylpolysiloxane compound:

181.0 g

Synthesis Example 7

In a flask equipped with a cooling device, a thermometer and a stirring device, 61.1 g of glycerine monoallyl ether and 738.9 g of ε-caprolactone were placed, and heated at 140° C. as nitrogen gas was passed therethrough. Then, 0.08 g of tetrabutyltitanate was added thereto as catalyst, and the polymerization was run for 4 hours at 140° C. under at atmosphere of nitrogen. Thus, 785 g of pale yellow, transparent, viscous liquid represented by the following structural formula was obtained. This liquid was converted to white solid by cooling, and had a melting point of 46° C. and a hydroxyl equivalent of 864 g/mol.

Herein, E represents $-(C(CH_2)_5O)-$.
$\phantom{xxxx}\|$
$\phantom{xxxx}O$

EXAMPLE 1

In a flask equipped with a cooling device, a thermometer and a stirring device, a 338.8 g portion of the hydroxyl group-containing dimethylpolysiloxane compound obtained in Synthesis Example 1 and 461.2 g of ε-caprolactone were placed, and heated at 140° C. as nitrogen gas was passed therethrough.

Then 0.08 g of tetrabutyltitanate was added thereto, and the polymerization was run for 4 hours at 140° C. under an atmosphere of nitrogen. Then, 782 g of pale yellow, transparent, viscous liquid was obtained. This liquid was converted to white solid by cooling, and had a melting point of 46° C. according to DSC analysis and a hydroxyl equivalent of 387 g/mol. On the other hand, a polystyrene-reduced weight average molecular weight of this liquid, which was determined by GPC measurement, was 5,682. Results of IR spectral analysis (FIG. 1) and $^1$H-NMR spectral analysis (FIG. 2) are shown below.

Figure 1:
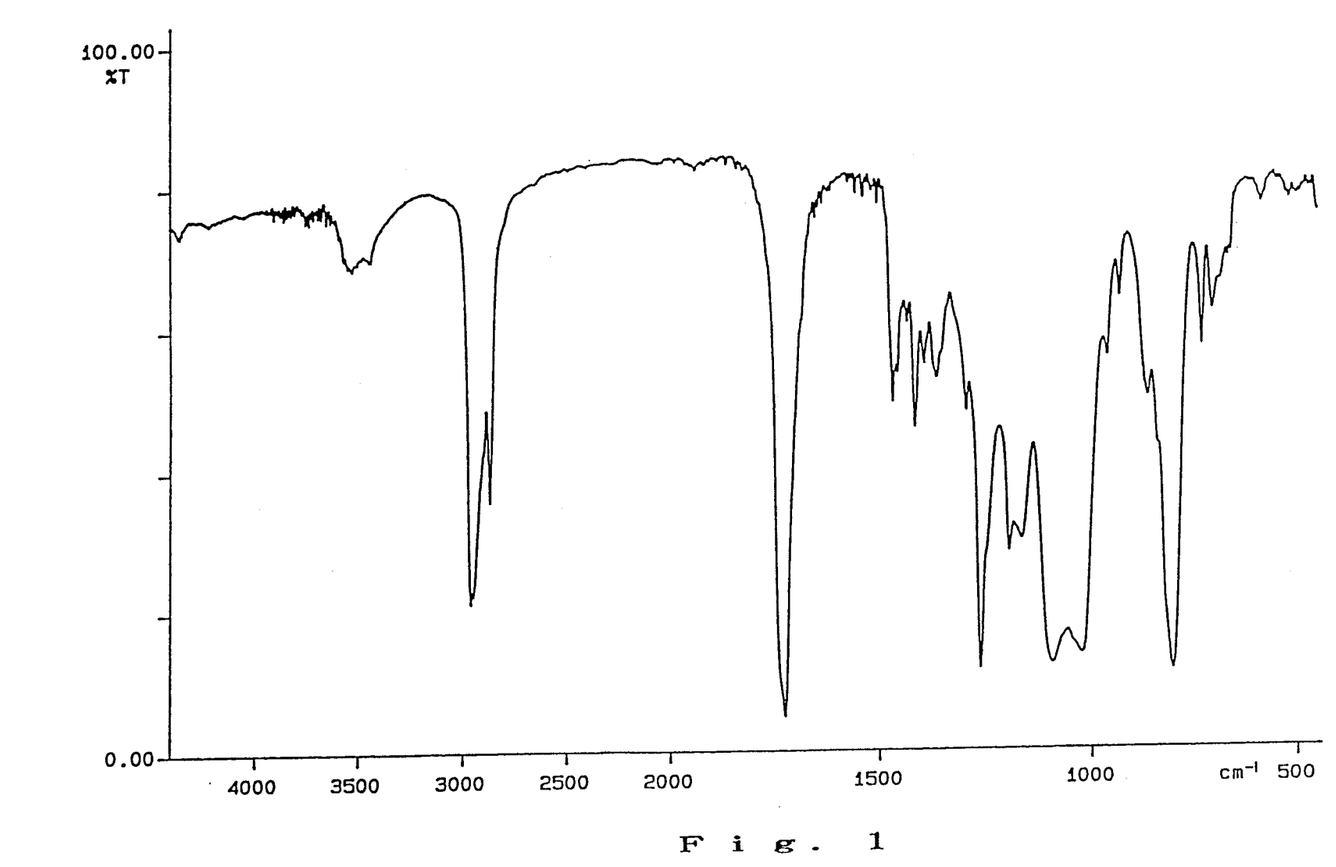
FIG. 1 shows an infrared (IR) spectrum of the compound obtained in Example 1.
Figure 2:
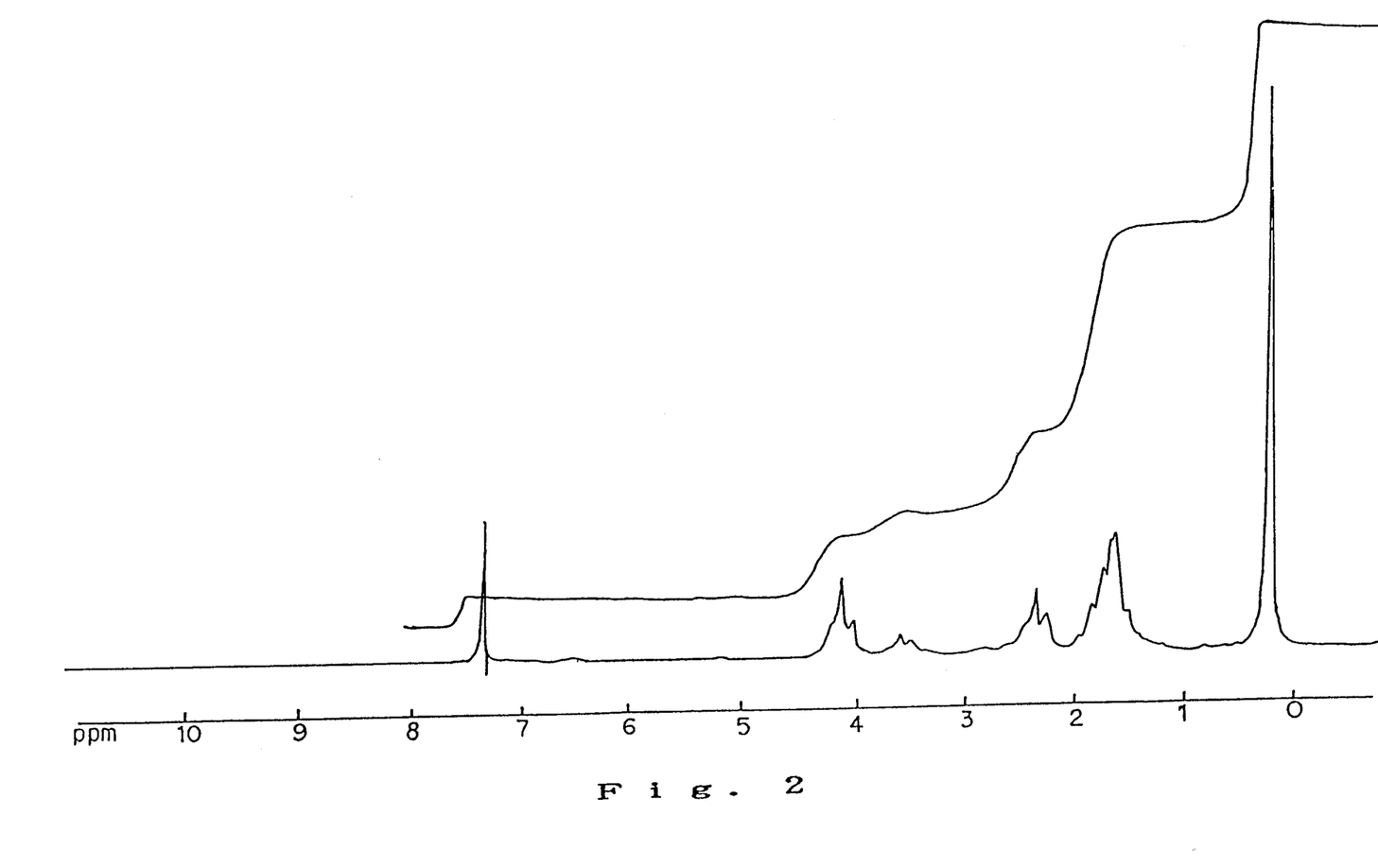
FIG. 2 shows a nuclear magnetic resonance (NMR) spectrum of the compound obtained in Example 1.
Figure 3:
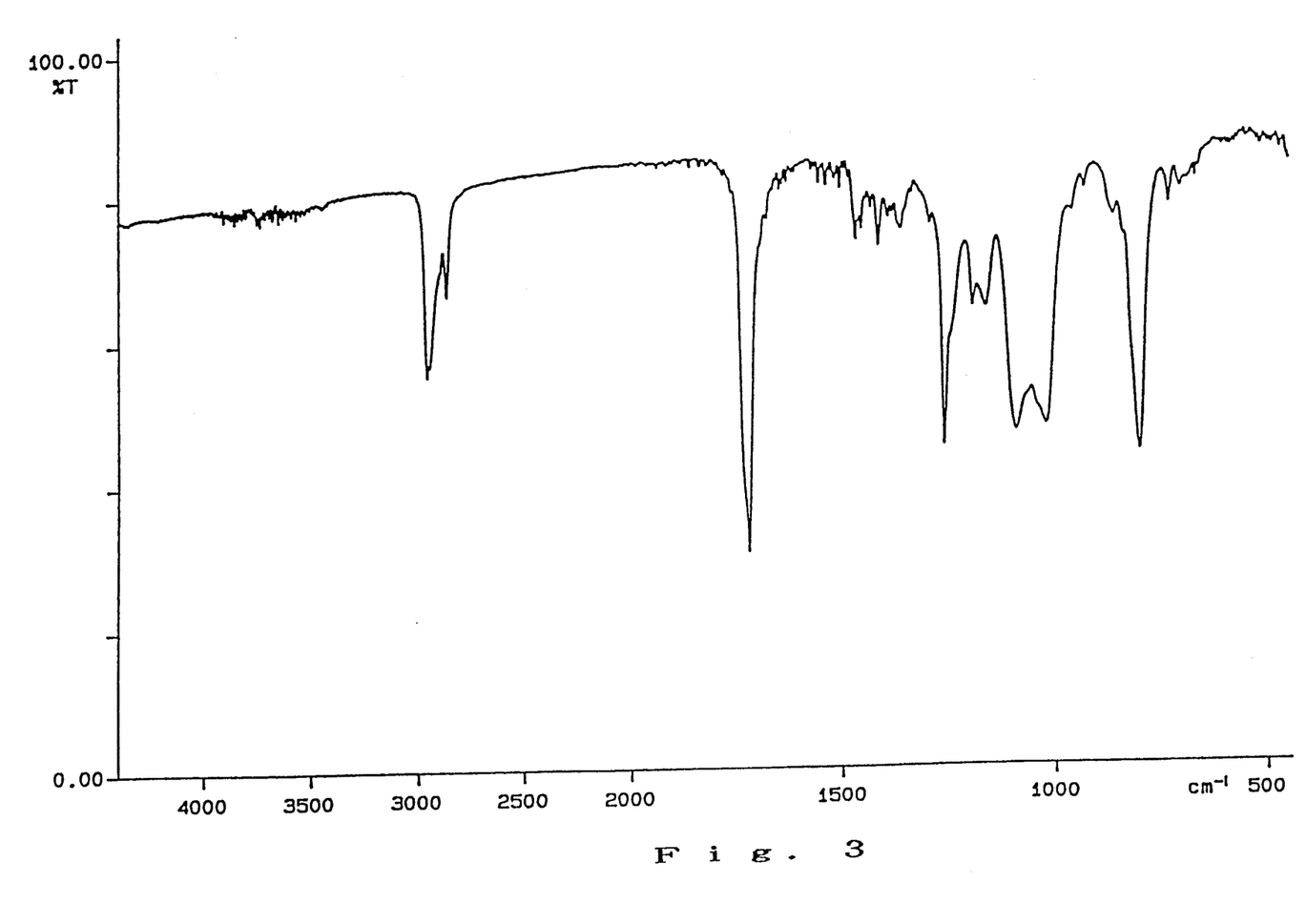
FIG. 3 shows an infrared (IR) spectrum of the compound obtained in Example 11.
Figure 4:
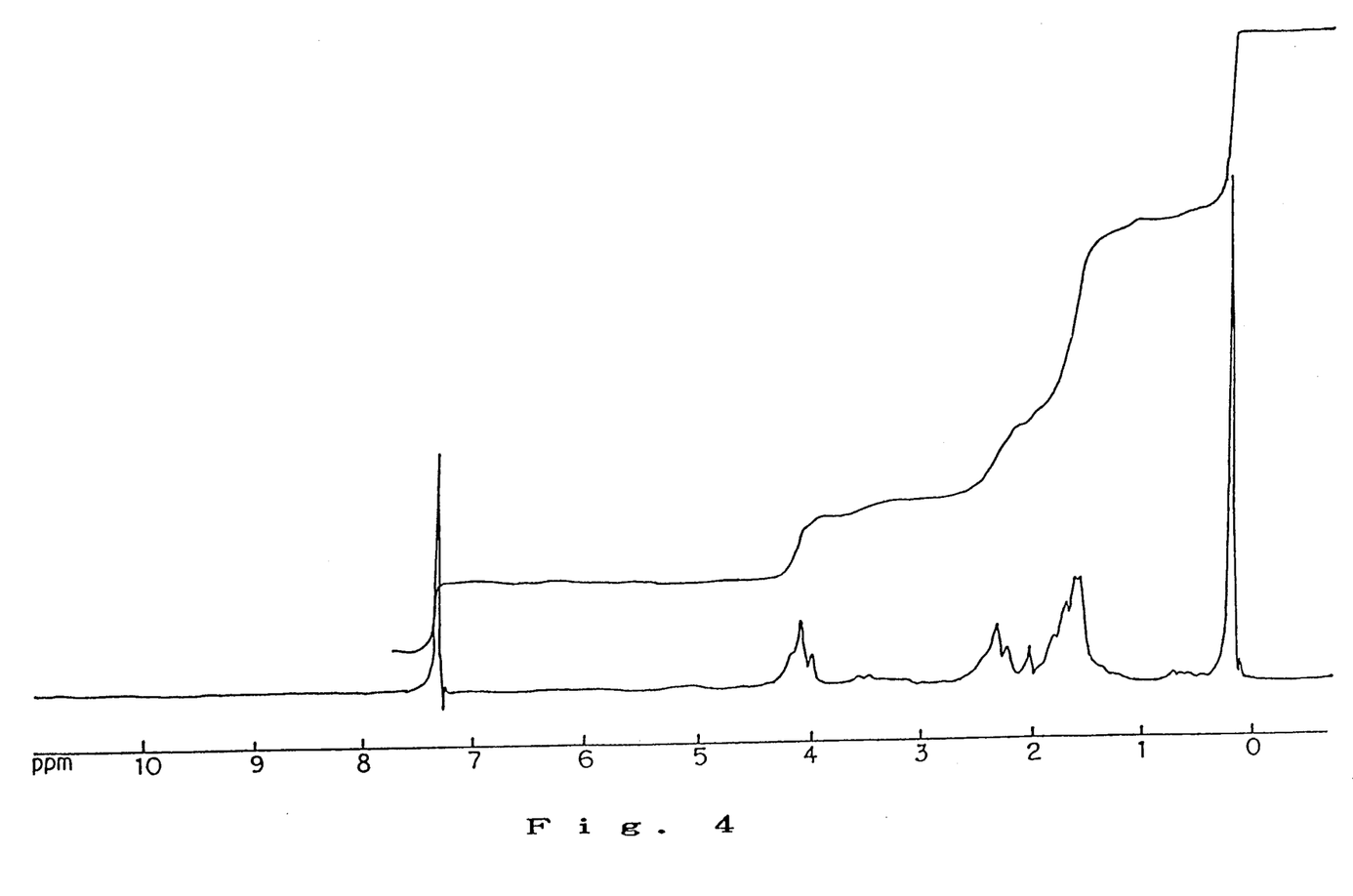
FIG. 4 shows a nuclear magnetic resonance (NMR) spectrum of the compound obtained in Example 11.

These results indicated that the obtained polymer had the following average structural formula:

IR analysis: C—OH: 3,500 cm$^{-1}$;

1,725 cm$^{-1}$;
SiOSi: 1090 and 1,025 cm$^{-1}$; —CH$_3$ and —CH$_2$—: 2,950 cm$^{-1}$; Si—CH$_3$: 1,263 cm$^{-1}$; Si—C: 800 cm$^{-1}$.

$^1$H-NMR analysis: (benzene as internal standard: δ7.25 ppm) 0.13 (Si—CH$_3$, S, 168H), 0.47~0.67 (Si—CH$_2$, m, 4H), 1.10~2.00 (C—CH$_2$—C, m, 172H), 2.00~2.67

3.23~3.77 (O—CH$_2$—C, m, 16H), 3.77~4.40

5.13~5.30

EXAMPLE 2

The same procedures as in Example 1, except that the amount of ε-caprolactone used was changed to 1,845.5 g and the amount of tetrabutyl titanate added was changed to 0.22 g, were carried out to obtain 2,140 g of a white solid having a melting point of 60° C., a hydroxyl equivalent of 3,783 g/mol, and a polystyrene-reduced weight average molecular weight of 15,312. Further, results of IR spectral analysis and $^1$H-NMR spectral analysis indicated that the obtained polymer had the following average structural formula:

EXAMPLE 3

The same procedures as in Example 1, except that the amount of ε-caprolactone used was changed to 197.7 g and the amount of tetrabutyl titanate added was changed to 0.05 g, were carried out to obtain 525 g of white paste having a melting point of 28° C., a hydroxyl equivalent of 928 g/mol, and a polystyrene-reduced weight average molecular weight of 3, 783. Further, results of IR spectral analysis and $^1$H-NMR spectral analysis indicated that the obtained polymer had the following average structural formula:

EXAMPLE 4

The same procedures as in Example 1, except that the hydroxyl group-containing dimethylpolysiloxane compound was replaced by a 771.3 g portion of the compound obtained in Synthesis Example 2 and the amount of tetrabutyl titanate added was changed to 0.12 g, were carried out to obtain 1, 206 g of a white solid having a melting point of 59° C., a hydroxyl equivalent of 6, 102 g/mol, and a polystyrene-reduced weight average molecular weight of 25, 116. Further, results of IR spectral analysis and $^1$H-NMR spectral analysis indicated that the obtained polymer had the following average structural formula:

EXAMPLE 5

The same procedures as in Example 1, except that the hydroxyl group-containing dimethylpolysiloxane compound was replaced by a 468.1 g portion of the compound obtained in Synthesis Example 3 and the amount of tetrabutyl titanate added was changed to 0.09 g, were carried out to obtain 910 g of a white solid having a melting point of 40° C., a hydroxyl equivalent of 1, 613 g/mol, and a polystyrene-reduced weight average molecular weight of 3, 251. Further, results of IR spectral analysis and $^1$H-NMR spectral analysis indicated that the obtained polymer had the following average structural formula:

EXAMPLE 6

The same procedures as in Example 1, except that the hydroxyl group-containing dimethylpolysiloxane compound was replaced by a 430.0 g portion of the compound obtained in Synthesis Example 4 and the amount of tetrabutyl titanate added was changed to 0.09 g, were carried out to obtain 864 g of a white solid having a melting point of 52° C., a hydroxyl equivalent of 2, 231 g/mol, and a polystyrene-reduced weight average molecular weight of 8, 938. Further, results of IR spectral analysis and $^1$H-NMR spectral analysis indicated that the obtained polymer had the following average structural formula:

EXAMPLE 7

The same procedures as in Example 1, except that the hydroxyl group-containing dimethylpolysiloxane compound was replaced by a 134.9 g portion of the compound obtained in Synthesis Example 5 and the amount of tetrabutyl titanate added was changed to 0.06 g, were carried out to obtain 583 g of white paste having a melting point of 30° C., a hydroxyl equivalent of 443 g/mol, and a polystyrene-reduced weight average molecular weight of 1, 776. Further, results of IR spectral analysis and $^1$H-NMR spectral analysis indicated that the obtained polymer had the following average structural formula:

EXAMPLE 8

The same procedures as in Example 1, except that the hydroxyl group-containing dimethylpolysiloxane compound was replaced by a 361.4 g portion of the compound obtained in Synthesis Example 6, were carried out to obtain 806 g of white paste having a melting point of 27° C., a hydroxyl equivalent of 615 g/mol, and a polystyrene-reduced weight average molecular weight of 27,884. Further, results of IR spectral analysis and $^1$H-NMR spectral analysis indicated that the obtained polymer had the following average structural formula:

EXAMPLE 9

In a flask equipped with a cooling device, a thermometer and a stirring device, 149.3 g of SiH group-containing dimethylpolysiloxane compound having an average structural formula, 250.7 g of allyl group-containing polycaprolactone obtained in Synthesis Example 7, 0.15 g of a 2 wt % 1-butanol solution of chloroplatinic acid and 400 g of toluene were placed, and underwent the addition reaction for 5 hours at 100° C. After the disappearance of SiH group was ascertained, toluene was removed under reduced pressure to obtain 393 g of a white solid at room temperature. This polymer had the same melting point, the same hydroxyl equivalent, the same polystyrene-reduced weight average molecular weight, the same IR spectrum and the same $^1$H-NMR spectrum that the polymer obtained in Example 1 had, so it was ascertained that these polymers were the same one.

EXAMPLE 10

256.2 g of the hydroxyl group-containing dimethylpolysiloxane compound (hydroxyl equivalent: 854 g/mol) represented by the following average structural formula, 513.0 g of ε-caprolactone and 0.08 g of tetrapropyl titanate were used, and they were subjected to the same procedures as in Example 1. Thus, 747 g of a white solid having a melting point of 57° C., a hydroxyl equivalent of 2,568 g/mol and a polystyrene-reduced weight average molecular weight of 10,318. From the results of IR spectral analysis and $^1$H-NMR spectral analysis, the obtained polymer turned out to have the following structural formula:

EXAMPLE 11

In a flask equipped with a cooling device, a thermometer and a stirring device, 362.2 g portion of the polycaprolactone-modified organopolysiloxane compound obtained in Example 1, 4.1 g of pyridine, 39.6 g of triethylamine and 362.2 g of xylene were placed. Thereto, 32.0 g of acetic anhydride was added dropwise at room temperature with stirring, and then heated at 50° C. for 3 hours. Thereafter, pyridine, triethylamine, toluene and excess acetic anhydride were removed under reduced pressure. Thus, 359 g of a white solid was obtained. This solid had a melting point of 41° C. and a polystyrene-reduced weight average molecular weight of 5,848, but the presence of hydroxyl group was not detected in the hydroxyl value measurement. Additionally, results of IR spectral analysis and $^1$H-NMR spectral analysis carried out in the same manners as in Example 1 are shown below.

IR: —CH$_3$, —CH$_2$—: 2,950 cm$^{-1}$;

1,725 cm$^{-1}$; Si—CH$_3$: 1,263 cm$^{-1}$; SiOSi: 1,090 and 1,025 cm$^{-1}$; Si—C: 800 cm$^{-1}$.

$^1$H-NMR: (benzene as internal standard δ: 7.25 ppm) 0.10 (Si—CH$_3$, S, 168H), 0.43~0.73 (Si—CH$_2$, m, 4H), 1.10~1.93 (C—CH$_2$—C, m, 172H), 1.95

2.07~2.57

3.20~3.57 (O—CH$_2$—C, m, 8H), 3.77~4.40

4.90~5.10

From these results, it was concluded that the obtained polymer was represented by the following average structural formula:

EXAMPLE 12

The same procedures as in Example 11, except that said polycaprolactone-modified organopolysiloxane compound was replaced by a 988.8 g portion of the compound obtained in Example 2, were carried out to obtain 992 g of a white solid having a melting point of 60° C. and a polystyrene-reduced weight average molecular weight of 15,501. Also, it was ascertained by the hydroxyl value measurement that this solid did not contain any hydroxyl group. In addition, results of its IR and $^1$H-NMR spectral analyses indicated that the obtained polymer was able to be represented by the following average structural formula:

EXAMPLE 13

The same procedures as in Example 11, except that said polycaprolactone-modified organopolysiloxane compound was replaced by a 242.6 g portion of the compound obtained in Example 3, were carried out to obtain 251 g of white paste having a melting point of 28° C. and a polystyrene-reduced weight average molecular weight of 3,962. Also, it was ascertained by the hydroxyl value measurement that this paste did not contain any hydroxyl group. In addition, results of its IR and $^1$H-NMR spectral analyses indicated that the obtained polymer was able to be represented by the following average structural formula:

EXAMPLE 14

The same procedures as in Example 11, except that said polycaprolactone-modified organopolysiloxane compound was replaced by a 1,595.0 g portion of the compound obtained in Example 4, were carried out to obtain 1,599 g of white paste having a melting point of 58° C. and a polystyrene-reduced weight average molecular weight of 25,319. Also, it was ascertained by the hydroxyl value measurement that this paste did not contain any hydroxyl group. In addition, results of its IR and $^1$H-NMR spectral analyses indicated that the obtained polymer was able to be represented by the following average structural formula:

EXAMPLE 15

Each of the terminal hydroxyl group-containing polycaprolactone-modified organopolysiloxane compounds obtained in Examples from 1 to 8 and Example 11 was dissolved in an equiamount of toluene, and admixed with isocyanurate-bound HDI in such an amount as to satisfy the relation, OH/NCO=1/1 (by mole). Each mixture obtained was coated on a glass plate in a thickness of about 100 microns, and dried at 100° C. for 1 hour to effect the hardening of the coat. Thus, transparent films were obtained. Each film was examined for gel fraction, contact angle of water, and kinetic friction coefficient. Results of these measurements are shown in Table 2.

The data set forth in Table 2 demonstrate that the polylactone-modified organopolysiloxane compounds of this invention are extremely effective as film former.

TABLE 2

| Compound | Gel Fraction (%) | Contract Angle of water (°) | Kinetic Friction Coefficient |
|---|---|---|---|
| Example 1 | 95.2 | 100 | 0.12 |
| Example 2 | 94.3 | 95 | 0.15 |
| Example 3 | 95.3 | 102 | 0.13 |
| Example 4 | 92.6 | 105 | 0.11 |
| Example 5 | 90.5 | 102 | 0.12 |
| Example 6 | 95.6 | 103 | 0.15 |
| Example 7 | 96.8 | 91 | 0.24 |
| Example 8 | 95.3 | 102 | 0.21 |
| Example 10 | 95.0 | 103 | 0.15 |

Gel fraction: determined by Soxhlet's extraction (MEK/24 hours)
Contact angle of water: measured with a contact angle meter CA-A (made by Kyowa Kagaku K.K.)
Kinetic friction coefficient: measured with a kinetic friction coefficient meter (made by Kyowa Kagaku K.K.) under the following condition. rubbing element: SUS Ball, load: 50 g, speed: 20 cm/min.

EXAMPLE 16

A 1:1 (by weight) reaction product of epoxy resin (Epikote 1004, produced by Shell International Chemicals Corp.) with linseed oil was dissolved in toluene so as to obtain a 50 wt % solution. A one part by weight portion of this solution was mixed with 3 parts by weight of acryl resin (Aron 1001, produced by Toa Gosei Chemical Industry Co., Ltd.), and the resulting mixture was adjusted so as to have a resin concentration of 40 wt % by the addition of toluene. With the thus prepared coating material was admixed each of the polycaprolactone-modified organopolysiloxane compounds obtained in Examples from 1 to 8 and from 10 to 14 in a concentration of 0.1 wt %. The resulting compositions each was applied to three separate aluminum test panels (5 cm×10 cm) using a flow coating process, and air-dried for 1 hour, followed by 20 minutes' backing at 105° C. Every test panel thus made was examined for not only the appearance of film surface, but also kinetic friction coefficient and slip angle. In addition to the evaluation of the film surface's appearance, scratch resistance of the films was evaluated.

Results obtained are shown in Table 3.
Measurements of the kinetic friction coefficient and slip angle, and evaluation of the damage resistance of the films were made as follows.
Kinetic friction coefficient:
It was measured in the same way as in Example 15.
Slip angle:
It was determined in such a way that two test panels (5 cm×5 cm) of the same kind were brought into face-to-face contact with each other, a load of 250 g was imposed thereon, and an inclined angle at which the upper panel began to slip was measured.
Evaluation of damage resistance of film:
Two test panels (5 cm×5 cm) of the same kind were brought into face-to-face contact with each other, a load of 250 g was imposed thereon, one panel was forced to slide on the other panel, and then the film surface was examined as to whether they were damaged or not.

From the results shown in Table 3, the polylactone-modified organopolysiloxane compounds of this invention have proved to be extremely effective as synthetic-resin modifier.

TABLE 3

| Compound | Kinetic Friction Coefficient | Slip Angle (°) | Damage of Appearance of Film | Film Surface |
|---|---|---|---|---|
| Silicone-Free | 0.80 | 37 | dimmed by scratch | somewhat resemble to citron's skin |
| Example 1 | 0.25 | 20 | not dimmed due to no scratch | beautiful |
| Example 2 | 0.27 | 20 | not dimmed due to no scratch | beautiful |
| Example 3 | 0.25 | 20 | not dimmed due to no scratch | beautiful |
| Example 4 | 0.24 | 20 | not dimmed due to no scratch | beautiful |
| Example 5 | 0.24 | 20 | not dimmed due to no scratch | beautiful |
| Example 6 | 0.30 | 22 | not dimmed due to no scratch | beautiful |
| Example 7 | 0.36 | 23 | not dimmed due to no scratch | beautiful |
| Example 8 | 0.30 | 22 | not dimmed due to no scratch | beautiful |
| Example 10 | 0.25 | 20 | not dimmed due to no scratch | beautiful |
| Example 11 | 0.25 | 20 | not dimmed due to no scratch | beautiful |
| Example 12 | 0.21 | 19 | not dimmed due to no scratch | beautiful |
| Example 13 | 0.22 | 19 | not dimmed due to no scratch | beautiful |
| Example 14 | 0.21 | 18 | not dimmed due to no scratch | beautiful |
| Example 15 | 0.23 | 20 | not dimmed due to no scratch | beautiful |

What is claimed is:
1. A polylactone-modified organopolysiloxane compound wherein a polylactone-containing group represented by the formula (I) is bound to a silicon atom located at least either of the terminal positions and/or intermediate positions:

(I)

wherein Z represents a hydrocarbon residue which may contain oxygen, sulfur or/and nitrogen atom(s); X represents a lactone group of the formula, wherein R represents a hydrogen atom or an alkyl group containing from 1 to 12 carbon atoms; a represents an integer from 4 to 6; k and l each represents an integer of 1 or more; and Y represents a hydrogen atom or an acetyl group.

2. The polylactone-modified organopolysiloxane compound of claim 1 which is represented by the following general formula:

wherein A represents a polycaprolactone-containing group of the formula,

B and D each represents A or methyl group; m represents an integer from 0 to 200; and n represents an integer from 0 to 20; but when n is 0, at least either B or D must be A.

3. A synthetic resin modifier, which contains as a main component the polylactone-modified organopolysiloxane of claim 1.

4. The synthetic resin modifier of claim 3, further comprising the resin to be modified selected from among polyethylene resin, polypropylene resin, polyvinyl chloride resin, polystyrene resin, acrylonitrile-butadiene-styrene copolymer resin, acrylonitrile-styrene copolymer resin, styrene-butadiene copolymer resin, vinyl chloride-vinyl acetate copolymer resin, polymethylmethacrylate resin, saturated polyester resin, polyamide resin, polyurethane resin, epoxy resin, phenol resin, amino resin, polycarbonate resin, polyfluoroolefin resin, cellulose resin, polybutadiene resin, alkyd resin, or silicone resin.

5. The synthetic resin modifier of claim 3, wherein Y in the general formula (I) represents a hydrogen atom.

6. The synthetic resin modifier of claim 5, wherein resin to be modified is at least one group selected from among epoxy group, isocyanate group, carboxy group or alkoxysilyl group.

7. The synthetic resin modifier of claim 3, wherein at least one additive is selected from among a catalyst, a filler, a solvent, an antioxidant, an aging inhibitor, an antistatic agent or a coloring agent.

8. A film former which contains as a main component the polylactone-modified organopolysiloxane compound of claim 1, wherein Y in the general formula (I) represents a hydrogen atom.

9. The film former of claim 8, further comprising a polyfunctional cross-linking agent having two or more of substituent groups which are reactive to hydroxyl group.

10. The film former of claim 9, wherein said cross-linking agent is an isocyanate compound having not less than two isocynate functional groups.

11. The film former of claim 10, wherein an amount of the isocyanate compound is from 0.5-2.0 equivalents to one equivalent of the terminal hydroxyl groups of the polylactone-modified organopolysiloxane compound.

12. The film former of claim 8, further comprising an organotin compound as a catalyst selected from dibutyltin dioctate or dibutyltin dilaurate.

13. The film former of claim 12, wherein an amount of the organotin compound is 0.01-1.0 weight % to the main component.

14. The film former of claim 8, further comprising an inorganic filler.

15. The film former of claim 14, wherein the inorganic filler is at least one selected from silica, alumina, glass powder, clay, talc, calcium carbonate, mica powder, titanium dioxide, wollastonite, or magnesium hydroxide.

16. The film former of claim 15, further comprising an agent selected from among an oxidation inhibitor, aging inhibitor and, an antistatic agent.

* * * * *